Dec. 19, 1967 J. F. VARNELL, JR 3,359,511

AUTOMATIC GAIN CONTROL SYSTEM WITH PILOT SIGNAL

Filed Nov. 4, 1964 2 Sheets-Sheet 1

JOHN F. VARNELL, JR.
INVENTOR.

BY James H. Griffin

ATTORNEY

AUTOMATIC GAIN CONTROL SYSTEM WITH PILOT SIGNAL

Filed Nov. 4, 1964

JOHN F. VARNELL, JR.
INVENTOR.

BY James H. Griffin

ATTORNEY

Patented Dec. 19, 1967

3,359,511
AUTOMATIC GAIN CONTROL SYSTEM WITH PILOT SIGNAL

John F. Varnell, Jr., Atherton, Calif., assignor to Ampex Corporation, Redwood City, Calif., a corporation of California
Filed Nov. 4, 1964, Ser. No. 408,839
7 Claims. (Cl. 333—16)

ABSTRACT OF THE DISCLOSURE

A saturation variable transformer having a core with input and output windings thereon coupled by flux paths the saturation of which is variable in accordance with current passed through control windings on the core. The transformer may be employed to accomplish instantaneously variable attenuation of signals coupled between the input and output windings in accordance with a control signal applied to the control windings. The transformer is employable for a wide variety of attenuation applications including open and closed loop automatic gain control.

This invention relates in general to control devices and more particularly to an electrically variable alternating current (AC) attenuator.

Applicant's new attenuator will be described in connection with an automatic gain control (AGC) system, but it is to be understood that the principles of the invention may be applied as well in the areas of switching, gating, amplitude modulation, and anywhere else that attenuation of an AC signal may be practiced. Prior art circuits performing the above-mentioned functions used numerous vacuum tubes, diodes, transistors, and other components and were very closely limited or deficient in terms of linearity, phase shift, signal-to-noise ratio, and band width. The above-mentioned components were numerous, costly, and expensive to assemble; and, as a corollary, the circuits were subject to manufacturing defects, difficulty of adjustment, and likelihood of breakdown with age.

In the past, vardiable gain control (VGC) has usually been accomplished by coupling the signal to be controlled to a manually variable resistor mounted just behind the control panel of the electronic device involved. Thus, in the radio, television, or tape recorder fields, the signal was conducted through one long line into the variable resistor and thence through another long line back to the next circuit component involved in its processing.

The longer the lines coming and going, of course, the greater the sensitivity to all the various external disturbances that can degrade any electrical signal; so it became highly desirable to device some means for varying the gain of the video signal in place, as near to the preceding and succeeding stages in the video playback system as possible. Several methods have been tried, one of the early ones being a motor-operated variable resistor that could be remotely controlled from the panel of the tape recorder. Such a motorized potentiometer system, however, is bulky, heavy, and slow in response. Moreover, the necessity for accurate timing of the motor and gear reduction makes such a component quite expensive.

Various vacuum tube methods of VGC are available, but due to tube size and specialized power requirements, vacuum tubes are practically ruled out for any otherwise transistorized circuit. Another possibility is the so-called "Raysistor" (a Raytheon Co. trademark) a lightbulb in combination with a light sensitive variable resistance diode. Remote control of the degree of the illumination of the lightbulb varies the resistance of the diode and thus the gain of a signal passing through. Raysistor units have, however, proved unsatisfactory in operation: they are slow in response and very temperature unstable, exhibiting a temperature drift that is intolerable for some applications. Their behavior changes with age; yet the circuit in which they are used must be very carefully adjusted and designed to maintain operation along a very small portion of the diode curve, for the diode, of course, has an exponential transfer characteristic. As operation gets into the more nonlinear portions of the diode curve, amplitude distortion of the signal occurs.

Another problem related to attenuation is that of the switching of signals from multiple channels into a single output device (as in rotary head magnetic tape recording, playback mode) or, conversely, the switching of one signal into multiple channels (as in rotary head magnetic tape recording record mode). Since instantaneous switching produces noticeable transients on the composite signal, slow switching is becoming more favored. However, most slow switching devices used in the past practice of rotary head tape recording have been nonlinear in their attenuation, with the result that the summation signal produced by decreasing the signal from one channel and increasing the signal from another has not exhibited a uniform amplitude but rather has had a characteristic "hump" which shows up as amplitude distortion in the reproduced signal.

It is, therefore, a general object of this invention to provide an improved attenuating element.

Another object of this invention is to provide an attenuation element useable for slow switching, as between signal channels in a rotary head tape recorder system.

Another object is to provide a remote gain control system that does not require the transmission of the signal being controlled all the way to some point on the control panel and back again.

Another object of this invention is to provide a gain control circuit that is able to avoid "bounce"—the momentary change in the DC operating level of the circuit following each change of circuit gain.

Another object of this invention is to provide a variable gain control circuit which is temperature-stable, free of harmonic distortion, and does not contain components which exhibit deteriorating performance due to aging or variation of operating point.

Another object of this invention is to provide a component for slow switching circuits that will increase and decrease signals linearly and controllably, so that undesirable transients and level variations may be avoided.

Another object of this invention is to provide a variable gain control circuit which does not exhibit variations in phase or delay of the controlled signal as the gain is varied.

In the achievement of the above objects and as a feature of applicant's invention there is provided a signal coupling transformer wherein the transformer core is made of a ferrite having a hysteresis loop of minimal squareness and area. Geometrically, the transformer is constructed with special slots for control windings. The finished transformer is constructed with special slots for control windings. The finished transformer then has an input winding, an output winding, and control windings. The signal to be attenuated by the transformer is applied to the input winding and is taken from the output winding. The control windings have independent control or bias currents passing through them to keep the slotted portions of the transformer at any desired instantaneous operating point along the magnetization (H–B) curve of the ferrite. Changing the control currents changes the H–B operating point near the slots. Since the lines of flux between the transformer input and output windings must pass through this "saturation-variable" area, instantaneously variable attenuation can be accomplished on any signal being transformer-coupled between these input and output terminals.

As another feature of applicant's invention, if the control currents of the transformer herein described are coupled to a number of signal sources, the transformer may be operated as an "And" gate or an "Or" gate. As another feature of applicant's invention, there are described herein circuits for use of the above-described coupling transformer in AGC applications, both open-loop and closed-loop.

In summary, then, the instant invention features an electrically variable AC attenuator having a transformer core made of a ferrite having a hysteresis loop of minimal squareness and area, an aperture in the core such that four legs of the core are defined or some similar core "geometry," control slots in two opposed legs of the core so designed and placed that flux paths encircling each slot are substantially shorter than flux paths encircling the aperture, an input winding wound around one of the unslotted legs of the core, an output winding wound around the leg opposite that of the input winding, control windings wound through the control slots, both on that portion of the core between aperture and control slot and that portion of the core between the outer edge of the core and the control slot, the turns on each portion associated with a given control slot being equal in number and identical in sense, and means for applying control signals in antiphase to the control windings to vary the permeability of the magnetic flux path between the input winding and the output winding.

Other objects and features of this invention and a fuller understanding thereof may be had by referring to the following description and claims taken in conjunction with the accompanying drawings, in which:

Figure 1:
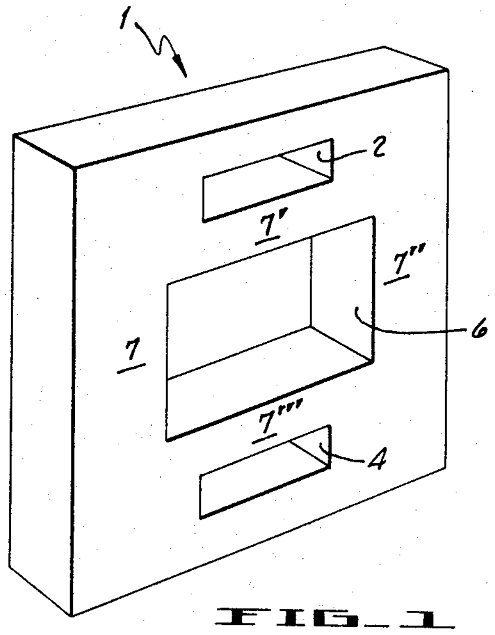
FIGURE 1 is a perspective view of an unwound core of the sort used in a preferred embodiment of applicant's invention.

Referring to FIGURE 1, a transformer core 1 such as is shown therein as used in a preferred embodiment of applicant's invention is constructed of any type of ferrite material having qualities of high initial permeability, low saturation induction, ideal saturation, low coercive force, and high specific resistance. It should be noted that these qualities are exactly the opposite of those heretofore valued in ferrites—they show graphically as a gently sloping, low-area B–H curve rather than the usual "square-loop" one. In the practice of applicant's invention the transformer core is made with control slots 2 and 4 as well as the usual central aperture 6 which divides the core into four "legs," 7, 7′, 7″, and 7‴.

Figure 2:
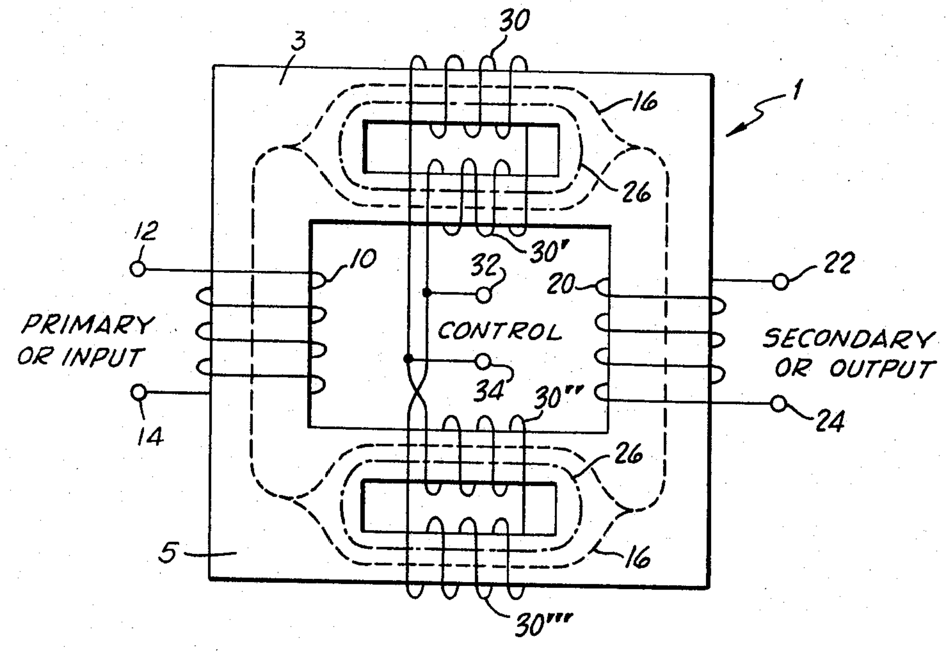
FIGURE 2 is a plan view of the core of FIGURE 1 showing schematically the windings thereon and the paths of flux resulting from energization of these windings.

Referring to FIGURE 2, when the transformer core of FIGURE 1 is wound, it has an input winding 10 coupled to input terminals 12 and 14, an output winding 20 coupled to output terminals 22 and 24, and a system of control windings 30 coupled to control terminals 32 and 34. The lines of flux in the transformer core 1 resulting from energization of the various windings are shown by the broken lines 16 and 26. The lines of flux 16 are induced by the input in the primary windings 10; they make a closed loop around the central aperture 6. The lines of flux 26 are induced by the control windings 30 and make closed loops around the control slots 2 and 4. If the path around the aperture 6 is made sufficiently longer than the path 26, almost none of the lines of flux induced by the control windings 30 will be found in the areas of the primary winding 10 or the secondary winding 20; and minute traces of leakage flux 26 can be eliminated in the input and output winding legs if the flux in each slot is opposed, due to the flux from the windings 30, 30′ being equal in number and opposite in sense to the flux from windings 30″ and 30‴.

Figure 4:
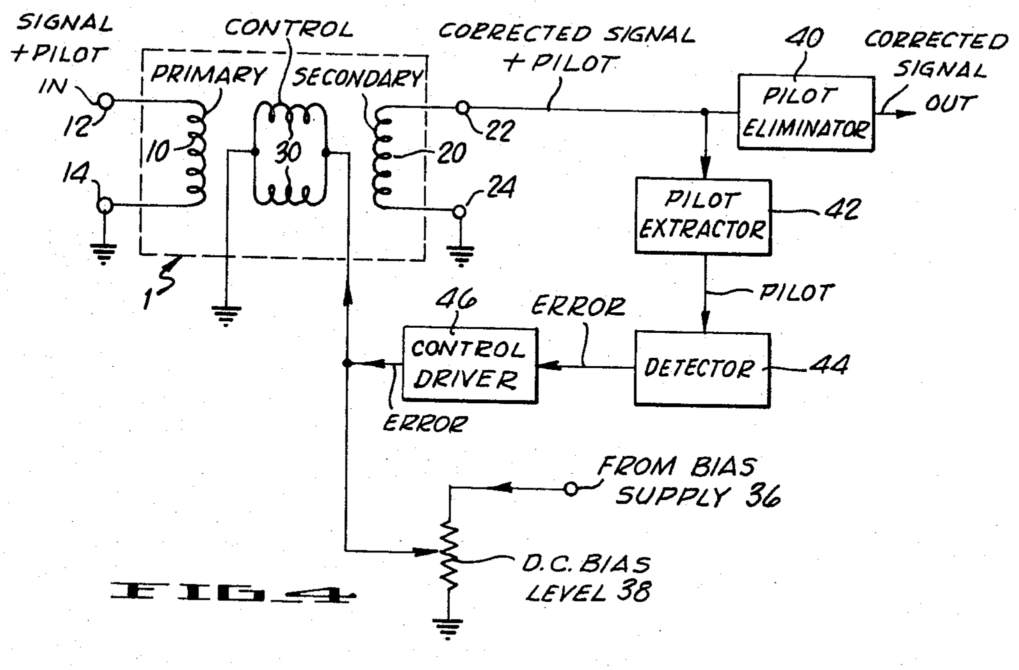
FIGURE 4 is a schematic circuit wherein the attenuator of applicant's invention is used for closed-loop amplitude control.

In the circuit of FIGURE 4, the transformer of FIGURES 1 and 2 is shown schematically by the dotted line numbered 1; schematic representation is also made of the primary winding 10, the terminal 14 of which is grounded, the secondary winding 20, the terminal 24 of which is grounded, and the control winding 30, a first end of which is also grounded. In the practice of feedback gain control using applicant's new transformer, the input signal is applied to the terminal 12 of the primary winding 10. Output from the transformer is taken from the terminal 22 of the secondary winding 20. The essentially DC currents through the control windings 30 are created in the following manner: current from a bias supply 36 is applied across the windings 30. The nominal level of this current may be varied by a potentiometer 38; the instantaneous level of the control currents through the windings 30 is determined by a feedback system to be described in detail immediately below.

The input signal appearing at the terminal 12 of the gain control system herein described would in many cases be an FM carrier with sidebands. For purposes of control current variation a sinewave pilot would be mixed with the FM signal before it is applied to the terminal 12. This sinewave would be very accurately controlled in both frequency and amplitude and would be of a frequency somewhere above or below the FM spectrum so as to be entirely distinct from the signal being processed by the gain control system herein described. The distance from the FM sideband would have to be sufficient to allow for sidebands of the sinewave carrier corresponding to any amplitude disturbance of the signal being processed, from DC up to the frequency of the highest amplitude disturbance to be corrected for by the automatic gain control system. At the output terminal 22 of the secondary 20 the pilot is separated from the signal to be corrected by the combined efforts of a pilot eliminator 40 and a pilot extractor 42. In practice, both the eliminator 40 and the extractor 42 might be high pass or low pass filters (depending upon whether the pilot is above or below the FM band). In either case, these filters (1) would be of a bandwidth sufficient to pass not only the pilot nominal frequency but also sidebands thereof and (2) would reject frequencies in the FM spectrum. The eliminator 40, of course, would be coupled to ground; the extractor 42 is the first element in a feedback loop which ends at the second end of the windings 30. The next element in the feedback loop is an FM detector 44 which rectifies, then smoothes the pilot signal in such manner that the carrier is eliminated therefrom. The remaining carrier error signal is applied to a driver 46 which varies the current through the windings 30.

Figure 5:
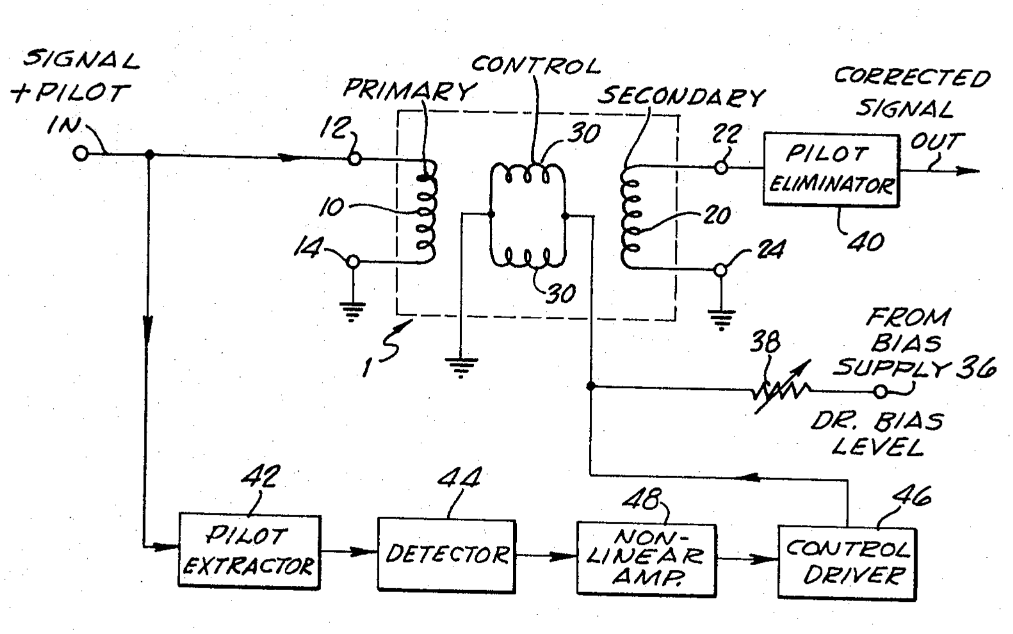
FIGURE 5 is a schematic circuit wherein the attenuator of applicant's invention is used for open-loop amplitude control.

In the open loop system shown in FIGURE 5, a transformer 1 identical to that of the foregoing figures may be used; and, as with the closed loop case in FIGURE 4, it will have a primary winding 10 having an input terminal 12 and a ground terminal 14, a secondary winding 20 having an output terminal 22 and a ground terminal 24, and control windings 30 having first ends coupled to ground and having second ends coupled to receive bias currents. Also as described above, bias currents are supplied from a source 36 and may be level-varied by a potentiometer 38. Instantaneous variation of the control current in the control windings 30 is accomplished by the use of a pilot signal as described in connection with the schematic of FIGURE 4; however, the pilot extractor 42 in the FIGURE 5 open loop attenuation circuit is coupled to the input terminal 12 rather than the output terminal 22, although the pilot eliminator 40 may still be in the transformer output circuitry. The same detector 44 and control driver 46 might also be used, but between them should be a non-linear amplifier 48 to compensate for the non-linear control characteristics inherent in open loop operation.

In the general operation of the transformer shown in detail in FIGURE 2, the signal to be attenuated is applied across the terminals 12, 14 of the input winding 10. The signal currents in the winding 10 induce closed loops of magnetic flux 16 in the transformer core 1. Likewise, control currents in the control windings 30 produce closed loops of flux 26 in the legs of the transformer 1 having slots 2 and 4.

Figure 3:
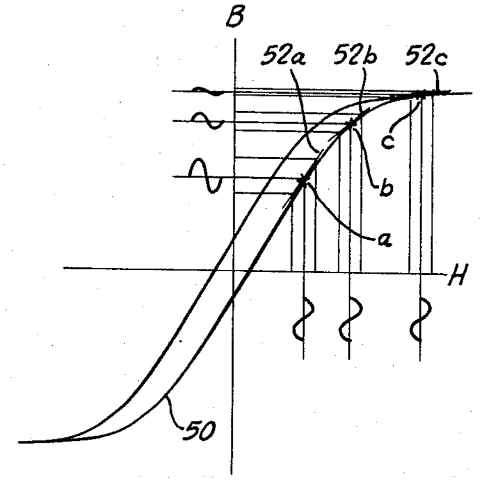
FIGURE 3 is a graph of the magnetization curve of the core of FIGURE 1.

Referring to FIGURE 3, a graph (curve 50) of magnetic flux density B in the core 1 relative to field strength H (itself proportional to current in the windings 10, 20, and 30), it can be seen that the slope 52 (the permeability of the ferrite) of the H–B curve 50 is different at the different operating points *a, b,* and *c*. In the transformer of FIGURE 2, these H–B operating points *a, b,* or *c* of the ferrite in the regions of the slots 2 and 4 are set by the current in the control windings 30 creating lines of flux 26. The flux 16 then operates along that H–B slope 52 associated with whichever operating point the control current magnetization has set. Thus the same input current in the winding 10 (i.e., the same H) will produce different values of $B/H$ at each different point *a, b,* or *c*; and the current induced in the secondary 20 will be varied accordingly. In the practice of applicant's invention, the flux 16 is sufficiently small that the curve 50 approximately follows the slope 52 associated with any operating point, throughout the input signal range, especially in the region between points *b* and *c* where the magnetization curve 50 is influenced by increasing saturation of the ferrite; thus harmonic distortion is practically nonexistent.

The effect of control currents in the windings 30 of applicant's new variable permeability transformer as shown in FIGURE 2 has been described. The schematics of FIGURES 4 and 5 suggest the forms of circuitry, either servo or open loop, by which the control currents in the windings 30 may be maintained and instantaneously varied. The transformer according to FIGURE 2 was built and operated using Ferroxcube 101 for the core 1. The control windings 30 required about 15 ampere-turns drive current for full attenuation. The permeability in the region of the slots 2 and 4 was varied by a factor of 164. Phase shift between full signal and 6 db attenuation was under 0.5° for 1 mc. signals and under 2.0° for 5 mc. signals; and all harmonics were −50 db below the signal level.

Thus applicant has provided an improved attenuating element for slow switching and automatic gain control uses which is temperature stable, almost free of harmonic distortion, uncomplex, and not subject to deteriorating problems because of aging. If the control slots 2 and 4 in the transformer of FIGURE 2 are made sufficiently small relative to the aperture 2 and the legs 3 and 5 associated therewith are made exactly equal in dimensions, the degree of coupling between the control windings 30 and the signal windings 10 and 20 will be insignificant; and if the control windings 30 are driven in antiphase, signals therefrom in the windings 10, 20 will be cancelled out altogether. Thus applicant's attenuator is almost completely free of interference between the control signals and the signals to be attenuated.

A number of alternative arrangements will readily suggest themselves to those skilled in the art. For example, the control winding 30 could be wound around a third leg across the aperture 2 to variably shunt the flux 16 instead of providing series resistance to it. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A closed loop automatic gain control system having a variable permeability transformer with a core, an input winding, control windings, and output winding, said control windings varying the permeability of said core in accordance with control currents therein to thereby vary the attenuation of signals coupled between said input and output windings, said input winding being coupled to a source of input signal having a pilot signal superimposed thereon, first means coupled to said output winding for passing the pilot signal and blocking the input signal, and second means coupled to the first means for demodulating the pilot signal to produce a D.C. signal representative of the deviation of the transformer from a nominal attenuation level for varying the control currents in the control windings to correct said deviation.

2. In a closed loop automatic gain control system having an input terminal and an output terminal, the following: a variable permeability transformer having an input winding, control winding, and output winding, said control winding being coupled through a variable potentiometer to a power supply, said input winding being coupled to a source of input signal having a pilot signal superimposed thereon, said output winding being coupled both to first means for passing the pilot signal and blocking the input signal and to a second means for passing the input signal and blocking the pilot signal, and third means coupled to the first means for demodulating the pilot signal to produce a signal representative of the deviation of the transformer from a nominal attenuation level for varying the control currents in the control windings to correct said deviation.

3. In a closed loop automatic gain control system having an input terminal, an output terminal, and a ground terminal, the following: a variable permeability transformer having an input winding, control winding, and output winding, one end of each said input winding, said control winding, and said output winding being coupled to the ground terminal, a second end of said control winding being coupled through a variable potentiometer to a power supply, the second end of said input winding being coupled to a source of input signal having a pilot signal superimposed thereon, the second end of said output winding being coupled both to a first band pass filter for passing the pilot signal and blocking the input signal and to a second band pass filter for passing the input signal and blocking the pilot signal, a pilot signal detector coupled to the first band pass filter for demodulating the pilot signal to produce an error signal representative of the deviation of the transformer from a nominal attenuation level and a control signal drive amplifier coupled between the pilot detector and the second end of the control windings for varying the control currents in the control windings in response to the error signal from the pilot detector.

4. An open loop automatic gain control system having a variable permeabiilty transformer with an input winding, control winding, and output winding, said input winding being coupled to a source of input signal having a pilot signal superimposed thereon and said output winding being coupled to the output terminal of the circuit through first means for passing the input signal and blocking the pilot signal, second means coupled to the input winding for passing the pilot signal and blocking the input signal, and third means coupled between the second means and the control winding for demodulating the pilot signal to produce an error signal representative of the deviation of the input signal level from a nominal level for varying the control currents in the control winding.

5. An open loop automatic gain control system having a variable permeability transformer with an input winding, control winding, and output winding, said control winding being coupled through a variable potentiometer to a power supply, said input winding being coupled to a source of input signal having a pilot signal superimposed thereon, said output winding being coupled to the output terminal through first means for passing the input signal and blocking the pilot signal, second means coupled to the input winding for passing the pilot signal and blocking the input signal, and third means coupled between the second means and the control winding for demodulating the pilot signal to produce an error signal representative of the deviation of the input signal level from a nominal level for varying the control currents in the control winding.

6. An open loop automatic gain control system having a variable permeability transformer with an input winding, control winding, and output winding, said control winding being coupled through a variable potentiometer to a power supply, said input winding being coupled to a source of input signal having a pilot signal superimposed thereon, and said output winding being coupled to an output terminal for the system through first means for passing the input signal and blocking the pilot signal, second means coupled to the input winding for passing the pilot signal and blocking the input signal, a pilot signal detector coupled to the second means for demodulating the pilot signal to produce an error signal representative of the deviation of the input signal level from a nominal level, and a control signal drive amplifier coupled between the pilot detector and the control windings for varying the control currents in the control windings in response to the error signal from the pilot detector.

7. In an open loop automatic gain control system having an input terminal, an output terminal, and a ground terminal, the following: a variable permeability transformer having an input winding, control winding, and output winding, one end of each said input winding, said cotrol winding, and said output winding being coupled to the ground terminal, a second end of said control winding being coupled through a variable potentiometer to a power supply, the second end of said input winding being coupled to a source of input signal having a pilot signal superimposed thereon, the second end of said output winding being coupled to the output terminal through a first band pass filter for passing the input signal and blocking the pilot signal, a second band pass filter coupled to the seond end of the input winding for passing the pilot signal and blocking the input signal, a pilot signal detector coupled to the second band pass filter for demodulating the pilot signal to produce an error signal representative of the deviation of the input signal level from a nominal level, and a control signal drive amplifier coupled between the pilot detector and the second end of the control windings for varying the control currents in the control windings in response to the error signal from the pilot detector.

References Cited

UNITED STATES PATENTS

| | | | |
|---|---|---|---|
| 2,683,777 | 7/1954 | Anderson | 330—52 |
| 2,752,571 | 6/1956 | Terroni | 330—52 X |
| 2,804,583 | 8/1957 | Genurt | 323—56 X |
| 2,921,267 | 1/1960 | Thomas | 330—52 X |
| 2,938,180 | 5/1960 | Dewitz | 333—78 |
| 2,974,224 | 3/1961 | Ule | 330—132 X |
| 3,204,177 | 8/1965 | Michel | 323—56 |
| 3,242,419 | 3/1966 | Walburn | 323—56 |

FOREIGN PATENTS

| | | |
|---|---|---|
| 892,304 | 10/1953 | Germany. |

JOHN F. COUCH, *Primary Examiner.*

W. E. RAY, *Assistant Examiner.*